(No Model.)
J. & W. WAGNER.
ANIMAL HITCHING AND RELEASING DEVICE.
No. 325,462. Patented Sept. 1, 1885.
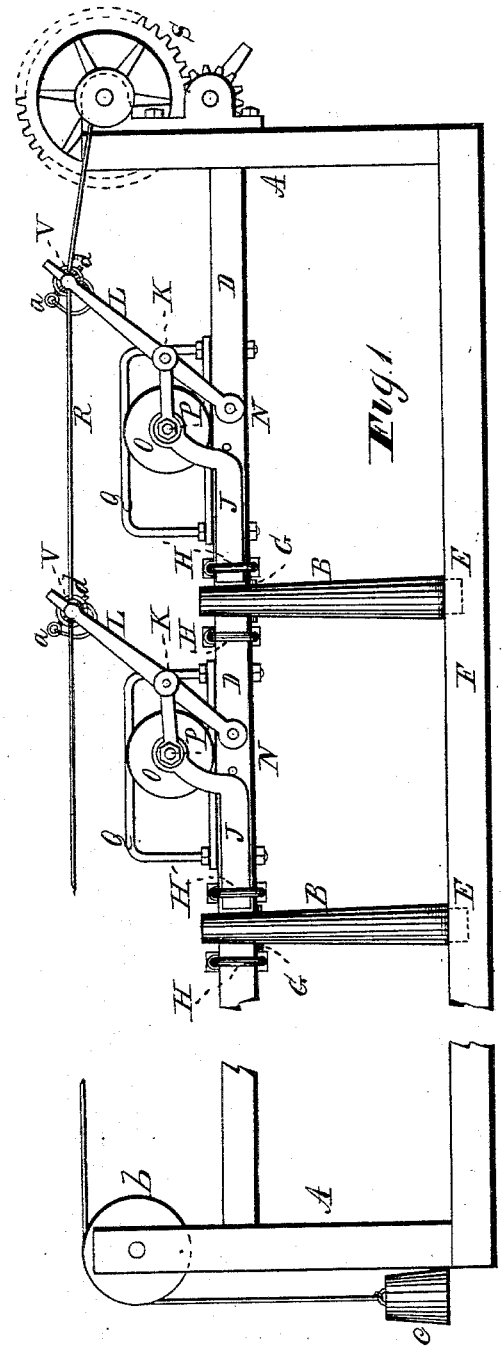
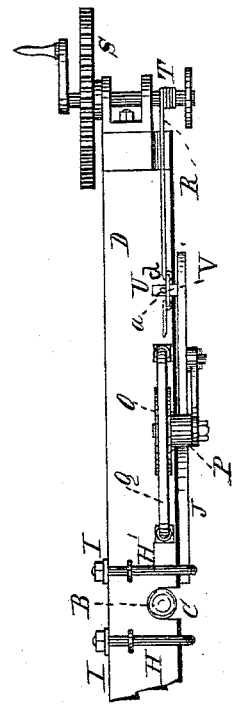
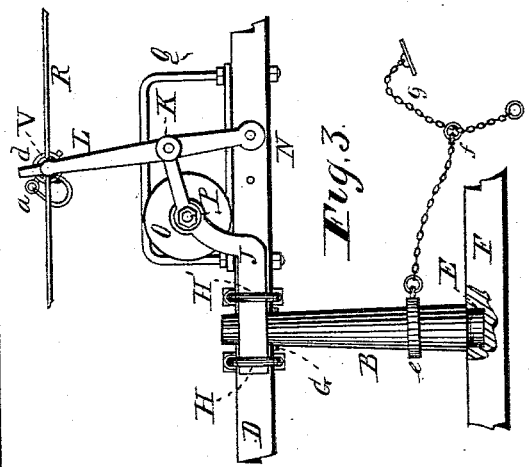

UNITED STATES PATENT OFFICE.

JOHN WAGNER AND WILLIAM WAGNER, OF COE RIDGE, OHIO.

ANIMAL HITCHING AND RELEASING DEVICE.

SPECIFICATION forming part of Letters Patent No. 325,462, dated September 1, 1885.

Application filed March 7, 1885. (No model.)

*To all whom it may concern:*

Be it known that we, JOHN WAGNER and WILLIAM WAGNER, of Coe Ridge, in the county of Cuyahoga and State of Ohio, have invented certain new and useful Improvements in Animal Hitching and Releasing Devices, of which the following is a specification.

The nature of the invention consists of a peculiar construction and arrangement by which cattle are securely held or tethered in feeding stalls or sheds, and may be released singly or collectively, more or less in number, as hereinafter shown and described.

It is known that wild cattle, and also domesticated ones, are tethered in sheds and buildings especially constructed for feeding and fattening them for home and foreign markets, as it is important that they be in good condition before shipping either by railway or in vessels. The wild cattle are more or less dangerous and vicious, and require to be properly and safely secured in the feeding-stalls for fattening. The mechanism or apparatus for this purpose admits of one or more of the animals being removed at a time, and in case of fire or other danger which would require the release of all at the same time and immediately it may be done by the same mechanism. In some cattle sheds or buildings for feeding there are hundreds and thousands of these wild cattle from Texas and other regions arranged in long sheds together side by side. It is well known that hundreds of such animals confined in buildings for feeding have been burned to death by firing of the sheds, as it is very difficult and dangerous to release them, owing to their wild and vicious nature and the means employed for securing them; hence they are left to destruction by fire. It not unfrequently occurs that one or more of the animals in lying down will do so in such way as to prevent the next beast from doing so without stepping over one already down. On doing this it is termed "cross-lying," as the animal in crossing over the one that is down causes the chain-tether to pass over the back, shoulders, or neck of the one down, which will at once attempt to rise as soon as the pressure of the chain is felt, but is more or less prevented by the weight of the animal attached to the tether which has crossed over the one attempting to rise. The two cattle in this condition struggle violently and viciously for release. It is difficult and dangerous for any person to release them in the ordinary way. Hence it results in one animal being strangled with the tether or both animals being injured before being released.

It is the object of this invention to provide a remedy for the purpose of avoiding and lessening the evils resultant of these conditions; and that the invention may be more fully understood reference will be had to the annexed drawings, and to the specifications herewith relating thereto.

Figure 1 is a side view elevation of a section of the said invention. Fig. 2 is a top view of a section of the same. Fig. 3 is also a section of Fig. 1.

Like letters refer to like parts in the several views.

For brevity, only two sections of the device are shown and described, but which, however, may be increased in number according to circumstances, as may be required for more cattle.

In the drawings, A represents the supports or frame-work of the device, which, however, may be constructed and arranged in any manner suitable for the purpose. To this frame is attached two or more adjustable posts, B, Fig. 1, the upper ends of which each fit, respectively, into a notch, C, cut into the stringer or plate D, as seen in Fig. 2, and the lower ends, E, are inserted in a mortise in the sill F, (shown in Fig. 3.) Near the upper ends is a shoulder or pins, G, Figs. 1 and 3, which prevent the posts from being raised up out of place in the mortise below until properly released, as hereinafter shown. On each side of the post is attached to the plate D a staple, H H', by means of straps and screw-nuts, as seen at I, Fig. 2, or other suitable fastenings. These staples are formed to receive the bolts J, respectively. One end of each is pivoted at K to each respective lever L, and the said levers are pivoted at their lower terminals to the plate D, as indicated at N, Figs. 1 and 3.

To facilitate the sliding movement of the bolts, which is essential when a number are arranged to operate conjointly, a roller, O, is pivoted to the shank of each bolt, as seen at P, by any suitable attachment. Each roller moves upon a track and is retained in position by the frame Q, in which the rollers move, the frame for the rollers being bolted to the plate D, as shown in the drawings. It is preferable to have the face of the rollers concave, to prevent their slipping out laterally from the frame in which they are placed to rotate in moving the bolt. The bolts J are so arranged that when moved into the staples H H', as seen in Fig. 3, the post B is prevented from being moved out of its position, as the weight C at the end of the wire line R will act as a counterweight and prevent the levers L and bolts J from moving back from the position seen in Fig. 3 to that shown in Figs. 1 and 2, unless the windlass, as hereinafter shown, is employed for that purpose.

To the upper ends of the levers L is attached a wire line, R, or its equivalent, one terminal of which is connected with the shaft or spool of the windlass S, as seen at T, Fig. 2. The attachment d is made by means of a wrist, U, projecting from the lever L, which engages a ring, V, linked into the line R, and to prevent the ring from being detached only as required a pin, a, is passed through the wrist U, which holds the ring upon the wrist with the pin upon one side and the lever on the other, as seen in Fig. 2. The opposite end of the line runs over a pulley, b, and has a weight, c, at the end, Fig. 1.

Around each post B is placed a ring, e, as seen in Fig. 3, to which is connected a chain with a swivel, f, and to this swivel is hung a neck chain or strap, g, provided with a clamp or any suitable fastening for securing it to the neck of the animal. When the cattle are thus tethered to the post B, their heads are allowed to extend through between the posts to a trough for feeding. The tether is of a length sufficient to allow the animals to lie down and move in changing position for rest.

Having described the construction and arrangement of the said invention, reference will be made to its practical operation.

First, supposing that a number of cattle are fastened by the means described side by side, each one to a separate post B, and it is desired to detach them from the posts for removing them as quickly as possible from confinement and from the building in case of fire, accident, or any other cause demanding immediate removal. This is readily done by turning the windlass S and winding up the line R, attached to the levers L, which turn the levers from the position seen in Fig. 3 to that in Fig. 1, at the same time also withdrawing the bolts J back from over the posts B, so that each post is free to move out of its position in the notch C and mortise E. By the animal turning to leave its place the post is readily drawn from the sill F and stringer D, so that the ring e of the tether slips off from the post, allowing the animal to be at liberty to leave the building with a chain upon the neck.

If, for any cause, it is desired to release one, or only a part of the animals, this is done by withdrawing the pin a from the wrist U, Fig. 2, and slipping the ring V off the wrist, which then allows the lever and the connected bolt J to be moved so as to release the post B from its connection with the sill and stringer, and allowing the animal to be freed without releasing any of the others from the fastenings. By this means it will be noted that one or more of the stock, in case of sickness or injury, or for other cause, may be removed without disturbing the tether of the other animals.

What we claim as our improvement, and for which Letters Patent are prayed, is—

1. In a cattle holder and releaser, the post B, removably connected to the stringer D above and to the sill E below, in combination with the sliding bolt J, lever L, and link connecting said bolt to the lever, chain R, and windlass S, for actuating said lever, for the purpose specified, and substantially as described.

2. In combination with the posts B, sliding bolt J, lever L, and link connecting said lever to the bolt, chain R, having one end thereof attached to the windlass S, and the opposite end depending from a sheave from which is suspended a weight, c, for the purpose specified, and substantially as described.

3. In combination with the chain or line R, lever L, sliding bolt J, and link connecting the lever to said bolt, the loop or ring V, wrist and pin a, for attaching the said chain to the lever, posts B, and staples H H', plate D, and sill for supporting the posts and staples, substantially as described, and for the purposes specified.

4. Pivoted to and in combination with the sliding bolts J, wheels or rollers O, adapted to run upon a track and retained thereon in a vertical position by a frame, Q, within which the rollers run, lever L, sliding bolt, and link connecting the said bolt to the lever, posts B, staples H H', and the devices for supporting the posts and staples, for the purposes specified, and substantially as set forth.

In testimony whereof we affix our signatures in presence of two witnesses.

JOHN WAGNER.
WILLIAM WAGNER.

Witnesses:
W. H. BURRIDGE,
J. W. BURRIDGE.